(12) United States Patent
Nawa

(10) Patent No.: US 6,590,743 B2
(45) Date of Patent: Jul. 8, 2003

(54) HEAD PROTECTION MECHANISM FOR USE IN A TAPE DRIVE THAT IS DRIVEN BY A RING CAM

(75) Inventor: Ikuichiro Nawa, Atsugi (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 53 days.

(21) Appl. No.: 10/005,591

(22) Filed: Oct. 29, 2001

(65) Prior Publication Data

US 2002/0051313 A1 May 2, 2002

(30) Foreign Application Priority Data

Oct. 30, 2000 (JP) ........................................ 2000-330280

(51) Int. Cl.⁷ ................................................. G11B 5/40
(52) U.S. Cl. ........................................................ 360/128
(58) Field of Search ................................... 360/128, 95

(56) References Cited

U.S. PATENT DOCUMENTS

| | | | |
|---|---|---|---|
| 5,414,585 A | | 5/1995 | Saliba |
| 5,751,529 A | * | 5/1998 | Stephens et al. ............ 360/128 |
| 5,793,574 A | | 8/1998 | Cranson et al. |
| 5,857,634 A | | 1/1999 | Hertrich |
| 5,862,014 A | | 1/1999 | Nute |
| 6,104,580 A | * | 8/2000 | Yoshiya et al. ............. 360/128 |
| 6,166,881 A | * | 12/2000 | Anderson et al. ........... 360/128 |
| 6,215,618 B1 | * | 4/2001 | Anderson et al. ........... 360/128 |
| 6,241,171 B1 | | 6/2001 | Gaboury |

FOREIGN PATENT DOCUMENTS

| | | |
|---|---|---|
| JP | 2000-100025 A | 4/2000 |
| JP | 2000-100116 A | 4/2000 |
| JP | 2000-149491 A | 5/2000 |
| WO | WO 86/07295 A1 | 12/1986 |
| WO | WO 86/07471 A1 | 12/1986 |

* cited by examiner

Primary Examiner—Robert S. Topper
(74) Attorney, Agent, or Firm—Frishauf, Holtz, Goodman & Chick, P.C.

(57) ABSTRACT

In a head protection mechanism (50) for protecting a magnetic head (31) so that a coupled portion of a reader tape (71) is not in contact with the magnetic head, a protection arm (51) is rotatably mounted on a main surface of a chassis (12) close to an actuator assembly (20). The protection arm has a tape passing groove (51a) and an arm portion (514). Rotatably mounted on a back surface of the chassis, a protection lever (54) has one end (541) which is close to a ring cam (62) and which is engageably disposed to a cam face (621). The protection lever has another end (542) which is coupled to a tip (514a) of the arm portion in the protection arm via a hole (12c) bored in the chassis. A spring (53) always urges the protection arm nearer to the actuator assembly.

4 Claims, 13 Drawing Sheets

HEAD PROTECTION MECHANISM FOR USE IN A TAPE DRIVE THAT IS DRIVEN BY A RING CAM

BACKGROUND OF THE INVENTION

This invention relates to a tape drive such as a linear tape storage system represented by DLT (digital liner tape) or LTO (linear tape open) and, in particular, to a head protection mechanism for protecting a magnetic head in the tape drive.

Linear tape storage systems of the type described are developed as "back-up" systems for hard disks of computer systems and various types of the linear tape storage systems have been proposed in prior art. For example, a digital linear tape drive serving as the DLT is disclosed in U.S. Pat. No. 5,862,014 to Nute, entitled: "Multi-Channel Magnetic Tape Head Module Including Flex Circuit" or the like.

The digital linear tape drive (which may be merely called "driving apparatus", "tape drive", or "drive") is for receiving a tape cartridge (which may be merely called "cartridge") having a single reel (a supply reel) and contains a take-up reel therein. When the tape cartridge is installed in the driving apparatus, a magnetic tape is pulled out of the tape cartridge and then is wound by the take-up reel through a head guide assembly (HGA). The head guide assembly is for guiding the magnetic tape (which may be merely called "tape") pulled out of the tape cartridge in a magnetic head. The magnetic head exchanges information between the tape and the magnetic head. The head guide assembly generally comprises a boomerang-shaped aluminum plate and six large guide rollers each using a bearing.

In addition, the head guide assembly is also called a tape guide assembly which is disclosed, for example, in U.S. Pat. No. 5,414,585 to Saliba, entitled: "Rotating Tape Edge Guide." In addition, an example of the guide roller is disclosed in Japanese Unexamined Patent Publication Tokkai No. 2000-100025 (JP 2000-100025 A).

The tape drive is generally comprised of a rectangular housing that has a common base as described, for example, in U.S. Pat. No. 5,793,574, entitled: "Tape Head Actuator Assembly Having A Shock Suppression Sleeve" to Cranson et al. The base has two spindle motors (reel motors). The first spindle motor has a spool (or a take-up reel) permanently mounted on the base and the spool is dimensioned to accept a relatively high speed streaming magnetic tape. The second spindle motor (reel motor) is adapted to accept a removable tape cartridge. The removable tape cartridge is manually or automatically inserted into the drive via a slot formed on the drive's housing. Upon insertion of the tape cartridge into the slot, the cartridge engages the second spindle motor (reel motor). Prior to rotation of the first and the second spindle motors, the tape cartridge is connected to the permanently mounted spool (the take-up reel) by means of a mechanical buckling mechanism. A number of rollers (guide rollers) positioned intermediate the tape cartridge and the permanent spool guide the magnetic tape as it traverses at relatively high speeds back and forth between the tape cartridge and the permanently mounted spool.

In the digital linear tape drive having such a structure, an apparatus for pulling the tape from the supply reel to the take-up reel is required. Such as a pulling apparatus is disclosed, for example, in International Publication Number WO 86/07471. According to WO 86/07471, take up leader means (a first tape leader) is coupled to the take-up reel while supply tape leader means (a second tape leader) is connected to the tape on the supply reel. The first tape leader has one end formed into a mushroom like tab. The second tape leader has a locking aperture. The tab is engaged into the locking aperture.

Furthermore, a mechanism for joining the first tape leader with the second tape leader is required. Such a joining mechanism is disclosed, for example, in International Publication number WO 86/07295.

In addition, Japanese Unexamined Patent Publication Tokkai No. 2000-100116 (JP 2000-100116 A) discloses a structure of leader tape engaging part which can engage an end part of a leader tape (the second tape leader) to a tape end hooking part in a tape cartridge without requiring a tab projected in the side of the leader tape.

U.S. Pat. No. 5,857,634, entitled: "Take-up Reel Lock" to Hertrich discloses a locking system for preventing a take-up reel of a tape drive from rotating when a tape cartridge is not inserted to the drive.

On the other hand, an example of the tape cartridge installed in the digital linear tape drive is disclosed in Japanese Unexamined Patent Publication Tokkai No. 2000-149491 (JP 2000-149491 A).

In addition, U.S. Pat. No. 6,241,171, entitled: "Leaderless Tape Drive" to Gaboury discloses a tape drive wherein a tape leader from a tape cartridge is urged through a tape path, into a take-up reel, and secured therein without the use of a bucking mechanism or a take-up leader.

In addition, the tape drive further comprises a tape head actuator assembly which is located between a take-up spool and a tape cartridge on a tape path defined by a plurality of rollers. During operation, a magnetic tape flows forward and backward between the take-up spool and the tape cartridge and is closely adjacent to the tape head actuator assembly while the magnetic tape flows on the defined tape path. An example of such as a tape head actuator assembly is disclosed in the above-mentioned U.S. Pat. No. 5,793,574.

Now, as is disclosed in the above-mentioned WO 86/07471, the first tape leader is coupled to the take-up reel while the second tape leader is connected to the tape on the supply reel contained in the tape cartridge. In addition, the tape leader is also called a "leader tape." After the tape cartridge is inserted in the slot of the tape drive and then the tape cartridge (the supply reel) is engaged with the supply reel motor, the first reader tape and the second reader tape are coupled to each other by using the joining mechanism as disclosed in the above-mentioned WO 86/07295. As illustrated in the drawing of the above-mentioned WO 86/07471, a coupled or joined portion between the first leader tape and the second leader tape has a shape projecting from a surface of the leader tapes up and down. Thereafter, a "tape-loading" for pulling the magnetic tape out of the tape cartridge (the supply reel) into the tape-up reel is carried out. In addition, after information exchange between the magnetic tape and the magnetic head in the magnetic head actuator assembly is completed, a "tape unloading" for rewinding the magnetic tape from the take-up reel in the tape cartridge (the supply reel) is carried out.

As described above, inasmuch as the above-mentioned coupled portion has the shape projecting from the surface of the tapes up and down, on tape loading and on tape unloading, it is necessary to protect the magnetic head so that the above-mentioned coupled portion is not in contact with the magnetic head in the magnetic head actuator assembly. Such a protection mechanism is called a "head protection mechanism." That is, by driving the protection mechanism except for a recording/reproducing mode in the tape drive, it is necessary to protect the magnetic head so that the above-mentioned coupled portion is not in contact with the magnetic head. On the other hand, on the recording/reproducing mode in the tape drive, by releasing the driving of the head protection mechanism, the tape drive operates so as to allow the magnetic tape to be in contact with the magnetic head. In other words, when the leader tapes (both of the first leader tape and the second leader tape) pass in the vicinity of the magnetic head actuator assembly, it is necessary to protect the magnetic head by driving the head protection mechanism so that the above-mentioned coupled portion is not in contact with the magnetic head.

In the manner which will later be described in conjunction with FIGS. 1 through 7, in a conventional head protection mechanism, it is necessary to lower the magnetic head from a normal used recording/reproducing position. As a result, an excessive space is required below the magnetic head. This prevents the tape drive from thinning. In addition, inasmuch as a driving force (a driving source) for the head protection mechanism is obtained by a stepping motor, the conventional head protection mechanism cannot have a sufficient axle ratio and is disadvantageous in that it is difficult to withstand a heavy lead.

SUMMARY OF THE INVENTION

It is therefore an object of the present invention to provide a head protection mechanism which is capable of thinning a tape drive.

It is another object of the present invention to provide a head protection mechanism of the type described, which is capable of withstanding a heavy lead.

On describing the gist of an aspect of this invention, it is possible to be understood that a head protection mechanism is for use in a tape drive. The tape drive comprises a chassis, a take-up reel rotatably mounted on a main surface of the chassis, a take-up reel motor mounted on a back surface of the chassis for rotatably driving the take-up reel, a slot disposed on the main surface of the chassis for inserting a tape cartridge containing a supply reel, a supply reel motor mounted on the back surface of the chassis at a position opposed to said slot for rotatably driving the supply reel in the tape cartridge, and a loading mechanism for engaging the supply reel with the supply reel motor after the tape cartridge is inserted in the slot. The loading mechanism includes a loading motor disposed on the back surface of the chassis and a ring cam operatively driven by the loading motor. The ring cam has a cam face. The ring cam is coaxial to a rotation axis of the supply reel motor. The ring cam is disposed between the back surface of the chassis and the supply reel motor. The tape drive further comprises an actuator assembly liftably mounted on the main surface of the chassis. The actuator assembly includes a magnetic head for carrying out information exchange between the magnetic head and a magnetic tape pulled from the supply reel to the take-up reel. The head protection mechanism is for protecting the magnetic head so that a coupled portion between a first reader tape of the take-up reel and a second reader tape of the supply reel is not in contact with the magnetic head on tape loading and on tape unloading. The head protection mechanism comprises a protection arm rotatably mounted on the main surface of the chassis close to the actuator assembly so as to cover the magnetic head. The protection arm has a tape passing groove through which the magnetic tape, the first and the second reader tapes pass. The protection arm includes an arm portion. Rotatably mounted on the back surface of the chassis, a protection lever has one end which is close to the ring cam and which is engageably disposed to the cam face. The protection lever has another end coupled to a tip of the arm portion in the protection arm via a hole bored in the chassis. Urging means always urges the protection arm nearer to the actuator assembly. When the tape drive is put into a recording/reproducing mode, the head protection mechanism acts to project the magnetic head into the tape passing groove so as to be in contact with the magnetic tape by positioning the one end of the protection lever at a position where the one end of the protection lever is not engaged with the cam face of the ring cam and by putting the protection arm close to the actuator assembly due to an urging force of the urging means. When the tape drive is not put into the recording/reproducing mode, the head protection mechanism acts to put back the magnetic head from the tape passing groove by engaging the one end of the protection lever with the cam face of the ring cam caused by rotatably driving of the ring cam using said loading motor and by separating the protection arm from the actuator assembly caused by rotatably moving of the protection lever in opposition to the urging force of the urging means. The urging means may comprise a spring has an end connected to the protection lever and another end connected to the chassis.

DESCRIPTION OF THE PREFERRED EMBODIMENT

Figure 1:
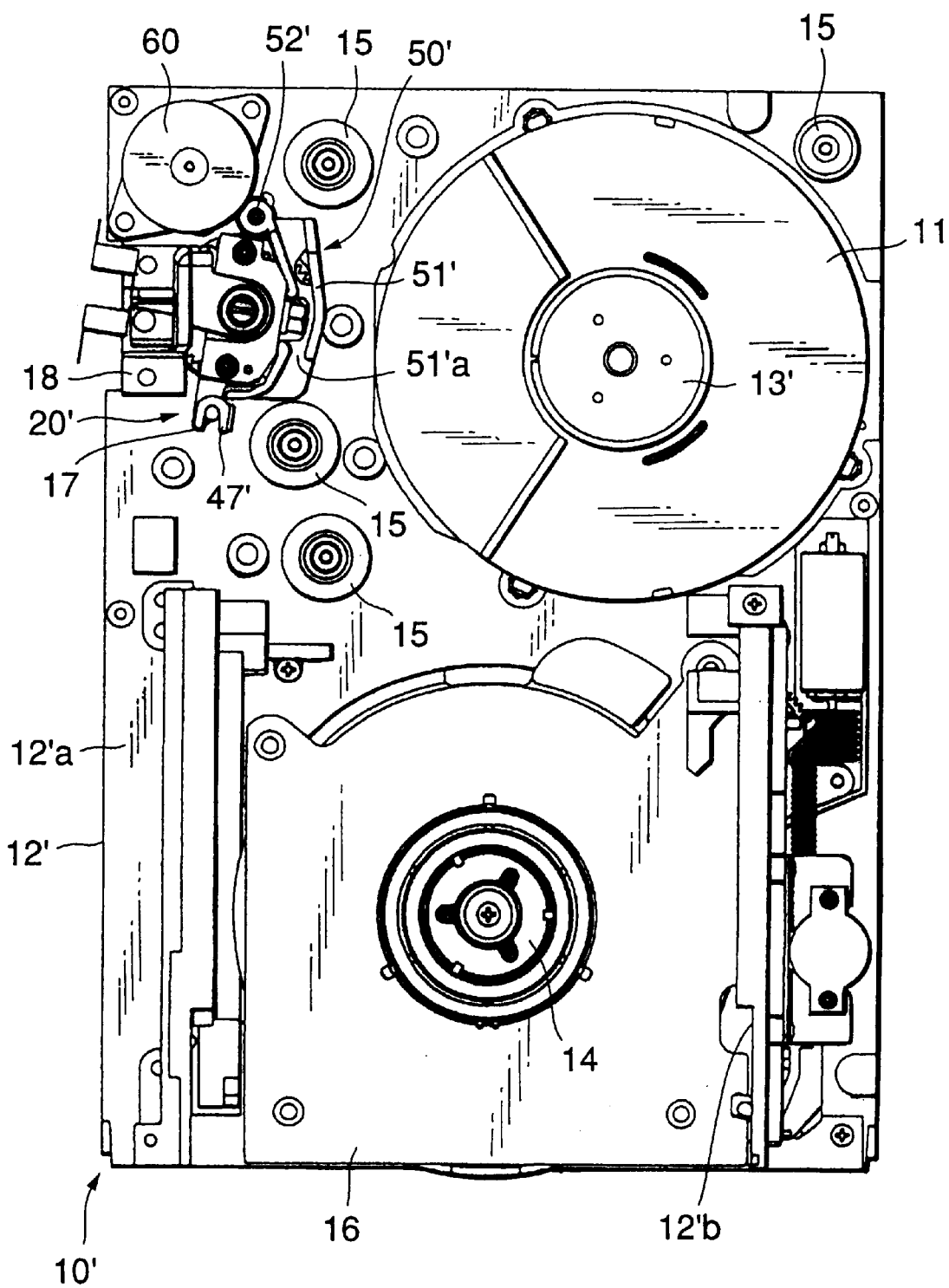
FIG. 1 is a plan view showing a conventional tape drive including a conventional head protection mechanism with an upper cover removed therefrom.

Referring to FIG. 1, a conventional tape drive including a conventional head protection mechanism will be described at first in order to facilitate an understanding of the present invention. FIG. 1 is a plan view showing the conventional tape drive with an upper cover is removed therefrom.

The tape drive depicted at 10' is for receiving a tape cartridge (not shown) and contains a take-up reel 11 inside thereof. The take-up reel 11 is also called a spool. The tape drive 10' is generally comprised of a rectangular housing (chassis) 12' that has a common base 12'a. The base 12'a has two spindle motors (reel motors) 13' and 14. The first spindle motor 13' has the spool (or the take-up reel) 11 permanently mounted on the base 12'a and the spool 11 is dimensioned to accept a relatively high speed streaming magnetic tape (not shown). The second spindle motor (reel motor) 14 is adapted to accept the removable tape cartridge. The removable tape cartridge is manually or automatically inserted into the tape drive 10' via a slot 12'b formed on the housing 12' of the tape drive 10' along an insertion direction depicted at an arrow A. The first spindle motor 13' is called a take-up reel while the second spindle motor 14 is called a supply reel motor.

Upon insertion of the tape cartridge into the slot 12'b of the tape drive 10', the cartridge engages the second spindle motor (the supply reel motor) 14 in a well-known manner in the art. Prior to rotation of the first and the second spindle motors (reel motors) 13' and 14, the tape cartridge is connected to the permanently mounted spool (the take-up reel) 11 by means of a mechanical buckling mechanism (not shown). A number of rollers (guide rollers) 15 positioned intermediate the tape cartridge and the permanent spool guide the magnetic tape as it traverses at relatively high speeds back and forth between the tape cartridge and the permanently mounted spool 11.

In addition, inasmuch as the housing (the chassis) 12' is made, by die-casting, of aluminum which is non-magnetic material, the second spindle motor 14 is cover with a plate 16 made of ionic magnetic material in order to shield magnetic leakage from a magnet (not shown) of the second spindle motor 14.

The tape drive 10' further comprises a magnetic tape head actuator assembly (which will later be merely called a "actuator assembly") 20'. The actuator assembly 20' is located between the take-up spool 11 and the tape cartridge on a tape path (not shown) defined by the above-mentioned plurality of rollers 15. During operation, a magnetic tape flows forward and backward between the take-up spool 11 and the tape cartridge and is closely adjacent to the actuator assembly 20' while the magnetic tape flows on the defined tape path. In addition, a conventional head protection mechanism 50' is disposed closely to the actuator assembly 20'. A component of the actuator assembly 20' is used as a component of the head protection mechanism 50' in the manner which will later be described.

Figure 2:
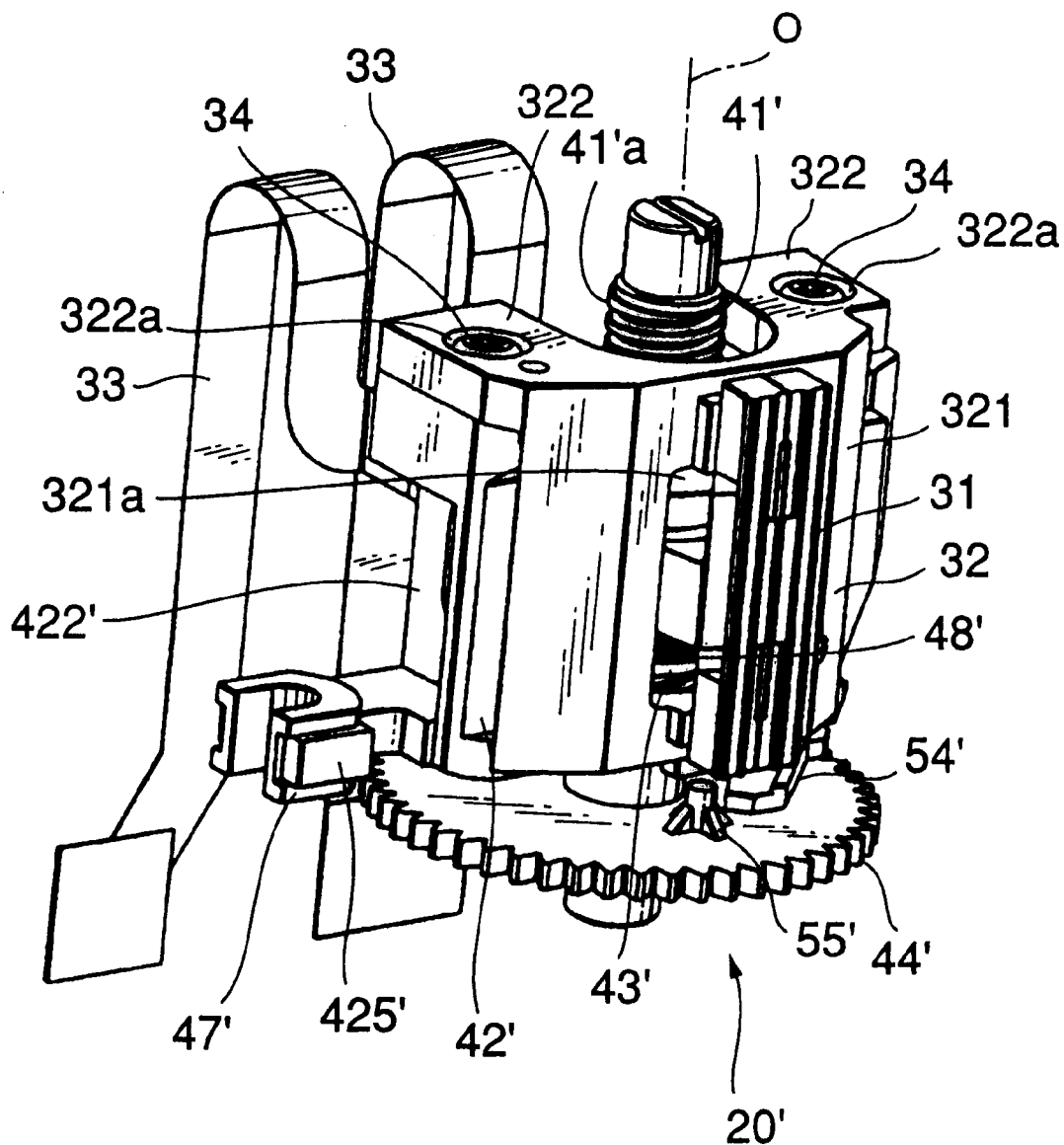
FIG. 2 is a perspective view showing a conventional actuator assembly including a driving portion of a conventional head protection mechanism.

Referring now to FIG. 2, the description will proceed to a conventional actuator assembly 20' comprising a driving part of the conventional head protection mechanism. FIG. 2 is a perspective view showing the exterior of the actuator assembly 20'.

The actuator assembly 20' mainly comprises a tape head assembly (which will later be merely called a "head assembly") and a head moving mechanism. The head assembly comprises a magnetic head (head) 31 extending up and down, a head holder 32 for holding the magnetic head 31, and a pair of flexible printed circuits (FPCs) for electrically connecting between the magnetic head 31 and an external circuit (not shown).

The head holder 32 comprises a head mounting portion 321 for mounting the magnetic head 31 thereon, a pair of flanges 322 for extending from both sides of an upper end of the head mounting portion 321 in a direction perpendicular to the head mounting portion 321 opposite to each other. Each of the flanges 322 has a hole 322a for receiving a screw 34. By screwing the screws 34 through the holes 322a, the head assembly and the later-mentioned head moving mechanism are assembled to each other. In addition, the head mounting portion 321 has, at about a center thereof, an opening 321a through which ends of the pair of the flexible printed circuits (FPCs) 33 and the magnetic head 31 are electrically connected to each other.

On the other hands, the head moving mechanism comprises a lead screw (a threaded shaft) 41' with a screw thread 41'a having a rotation center axis O, a head lifter 42' having a substantially O-shape with an opening (not shown) at a center thereof, a sprit nut (which will later be merely also called a "nut") 43', a lead screw gear 44'. The head lifter 42' is for moving the head assembly up and down with the above-mentioned head assembly held. The nut 43' is fixed on the head lifter 42' with the nut disposed in the opening of the head lifter 42'. The sprit nut 43' has a thread groove (not shown) engaged with the screw thread 41'a of the lead screw 41'. The lead screw gear 44' is mounted on the lead screw 41' at a lower end thereof. The lead screw gear 44' is driven by another driving arrangement to rotate the lead screw 41' around the rotation center axis O. Responsive to rotation of the lead screw 41' around the rotation center axis O, the sprit nut 43' moves the head lifter 42' in a direction extending the rotation center axis O (up and down).

The head lifter 42' has a projection portion 425' projecting from a lower end of one side wall portion 422' outwards. The projection portion 425' has a guide groove for receiving a guide 47'. In addition, the guide 47' is slidably mounted on a guide bar 17 (FIG. 1) up and down. The guide bar 17 is mounted on the base 12'a of the chassis 12' upwards. The guide 47' is for preventing the head lifter 42' from rotating.

The thread groove of the sprit nut 43' engages with the screw thread 41'a of the lead screw 41' to move the head lifter 42' along the rotation center axis O of the lead screw 41' up and down.

The sprit nut 43' has an annular groove (not shown) formed on its outer periphery. A doughnut-shaped spring (a circular spring) 48' is positioned in the annular groove. The doughnut-shaped spring 48' is a special coil spring formed in a configuration of a doughnut. The doughnut-shaped spring 48' provides an inwardly directed adapted compressive force on the nut 43'. In order to ease the deformation of the nut, the nut 43' further include an annular space (not shown) oriented normal the rotation center axis O.

Thus, when the lead screw 41' of the actuator assembly 20' (the head moving mechanism) rotates in either a clockwise or counterclockwise direction, the head lifter 42' and the head assembly mounted thereon will move up and down along the rotation center axis O in correspondence to rotation of the lead screw 41'.

In addition, a combination of the sprit nut 43' and the doughnut-shaped spring 48' serves as a backlash preventing mechanism for preventing backlash of the actuator assembly 20'. More specifically, in order to prevent the backlash between the lead screw 41' and the head lifter 42' in correspondence to rotation of the lead screw 41' on moving, the sprit nut 43' having sprits (slits) (not shown) is elastically deformed by the doughnut-shaped spring 48' to push to the lead screw 41' from side inwards.

In addition, the actuator assembly 20' (the head moving mechanism) is rotatably supported on the base 12'a of the chassis 12' by a bearing holder 18 (FIG. 1) mounted on the base 12'a.

Figure 3:
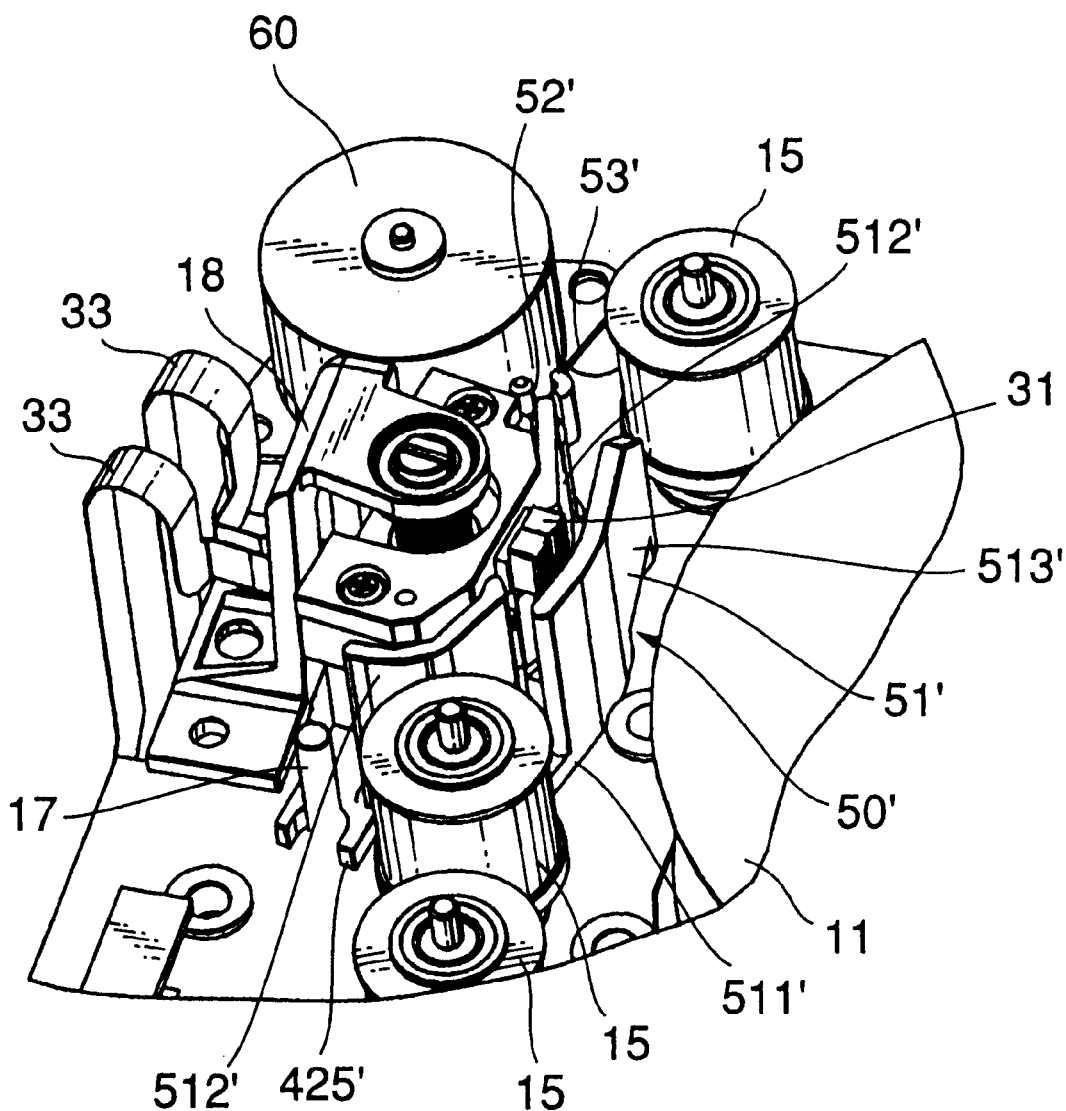
FIG. 3 is an enlarged perspective view showing a part of the conventional head protection mechanism.

Referring to FIG. 3 in addition to FIGS. 1 and 2, the description will proceed to the conventional head protection mechanism depicted at 50'.

As shown in FIG. 3, the head protection mechanism 50' comprises a protection arm 51' disposed closely to a front of the head assembly of the actuator assembly 20' so as to cover the magnetic head 31 of the head assembly. The protection arm 51' has a cross section of a substantially U-shaped and is rotatably disposed around the rotational shaft 52'. Around the rotational shaft 52', a spring 53' is wound. By the spring 53', the protection arm 53' is always urged toward the head assembly. That is, the spring 53' acts as an urging arrangement for urging the protection arm 51' toward the head assembly.

More specifically, the protection arm 51' comprises a base plate portion 511', a pair of inner protection plate portions 512', and an outer protection plate portion 513'. The pair of the inner protection plate portions 512' extends from an end of the base plate portion 511' at a side of the head assembly upwards perpendicular to the base plate portion 511' with the magnetic head 31 lain therebetween. The outer protection plate portion 513' extends from another end of the base plate portion 511' upwards perpendicular to the base plate portion 511' with apart from the pair of the inner protection plate portion 512' and the magnetic head 31 and with opposite to the magnetic head 31. That is, the protection arm 51' has a tape passing groove 51'a, which is formed between the pair of the inner protection plate portion 512' and the outer protection plate portion 513', for passing the magnetic tape or the above-mentioned leader tapes.

As shown in FIG. 2, the driving portion of the conventional head protection mechanism 50' (the protection arm 51') comprises a cam bar 54' and a projection 55'. The cam bar 54' is rotatably mounted on a base portion of the head lifter 42' around a rotatable shaft (which will later be described) at a lower side out of an end of the magnetic head 31. The projection 55' is mounted on an upper surface of the lead screw gear 44'. When the magnetic head (the head assembly) is moved downwards in the manner which will later be described, the projection 55' is engaged with the cam bar 54' to drive the cam bar 54' in a direction away from the lead screw 41'.

As a driving source (a driving force) for the driving portion of the head protection mechanism 50' (the protection arm 51'), a stepping motor 60 is used which is for rotatably driving the lead screw gear 44' of the actuator assembly 20' (the head moving mechanism). That is, the stepping motor 60 has a rotation shaft (not shown) which is engaged with the lead screw gear 44' through a row of gears which are not shown.

Figure 4:
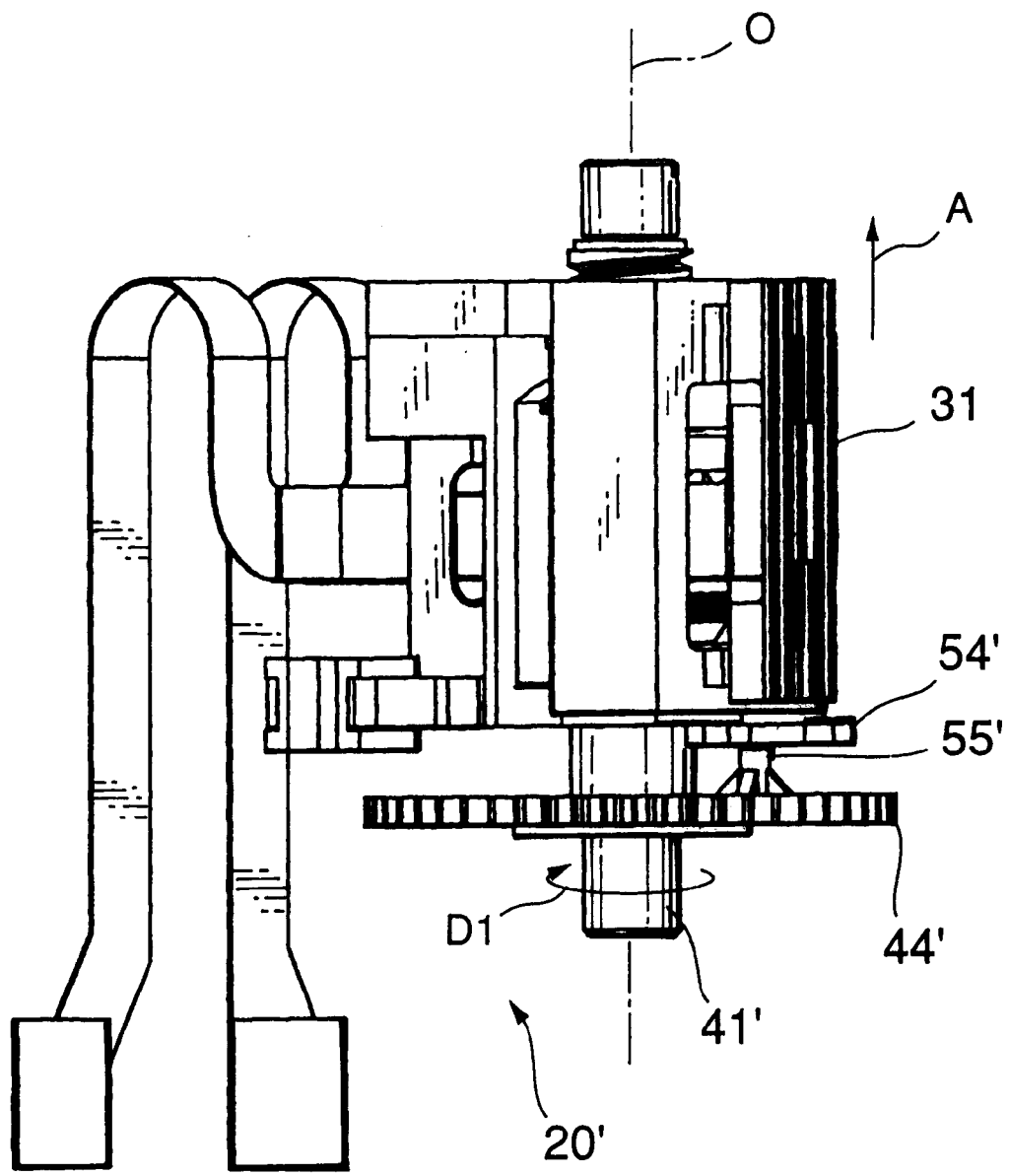
FIG. 4 is a side view of the conventional actuator assembly showing a position relationship between a cam bar of the conventional head protection mechanism and a lead screw gear when the conventional tape drive is put into a recording/reproducing mode.
Figure 5:
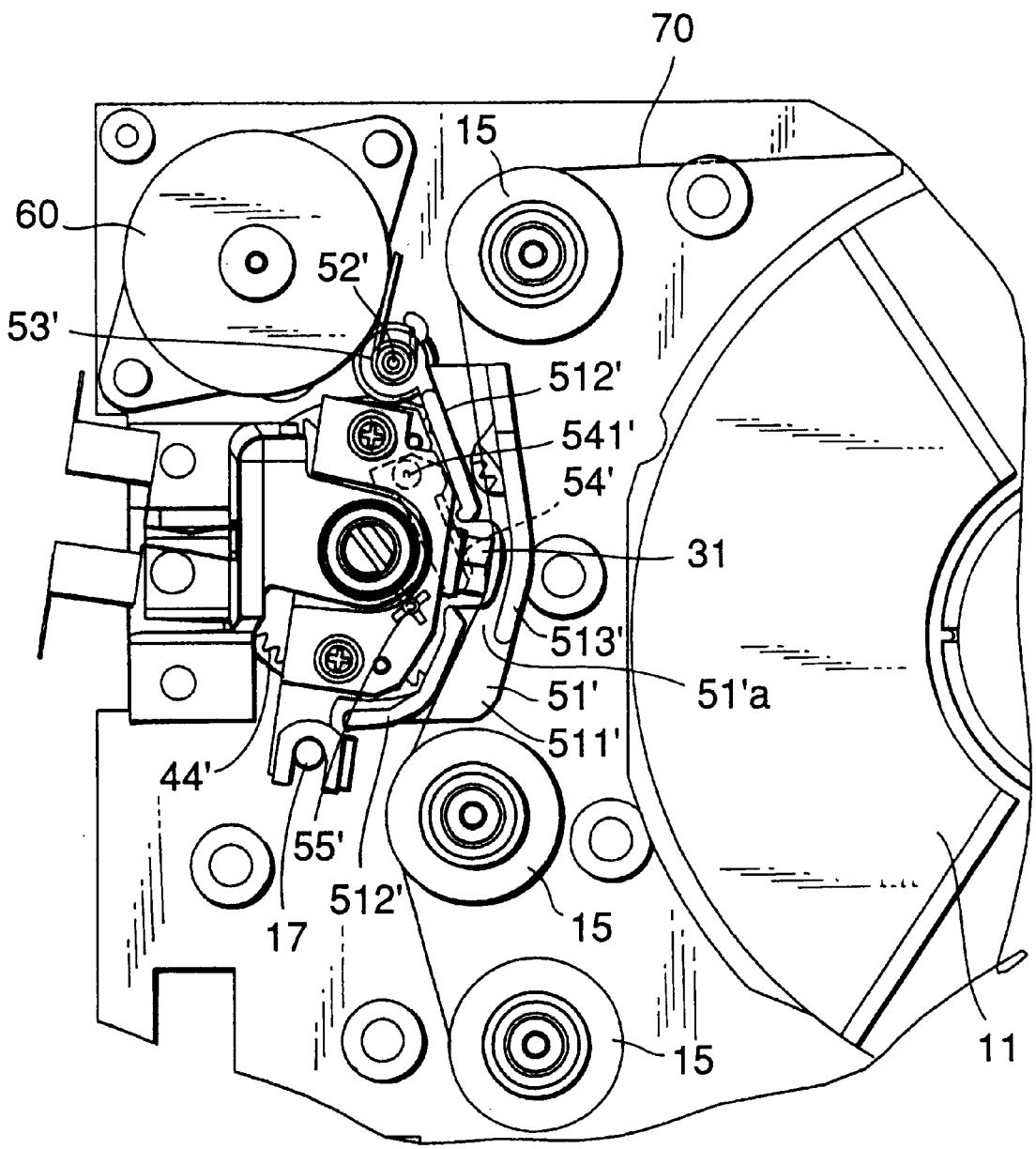
FIG. 5 is an enlarged plan view showing a position relationship of a protection arm in the conventional head protection mechanism when the conventional tape drive is put into the recording/reproducing mode.
Figure 6:
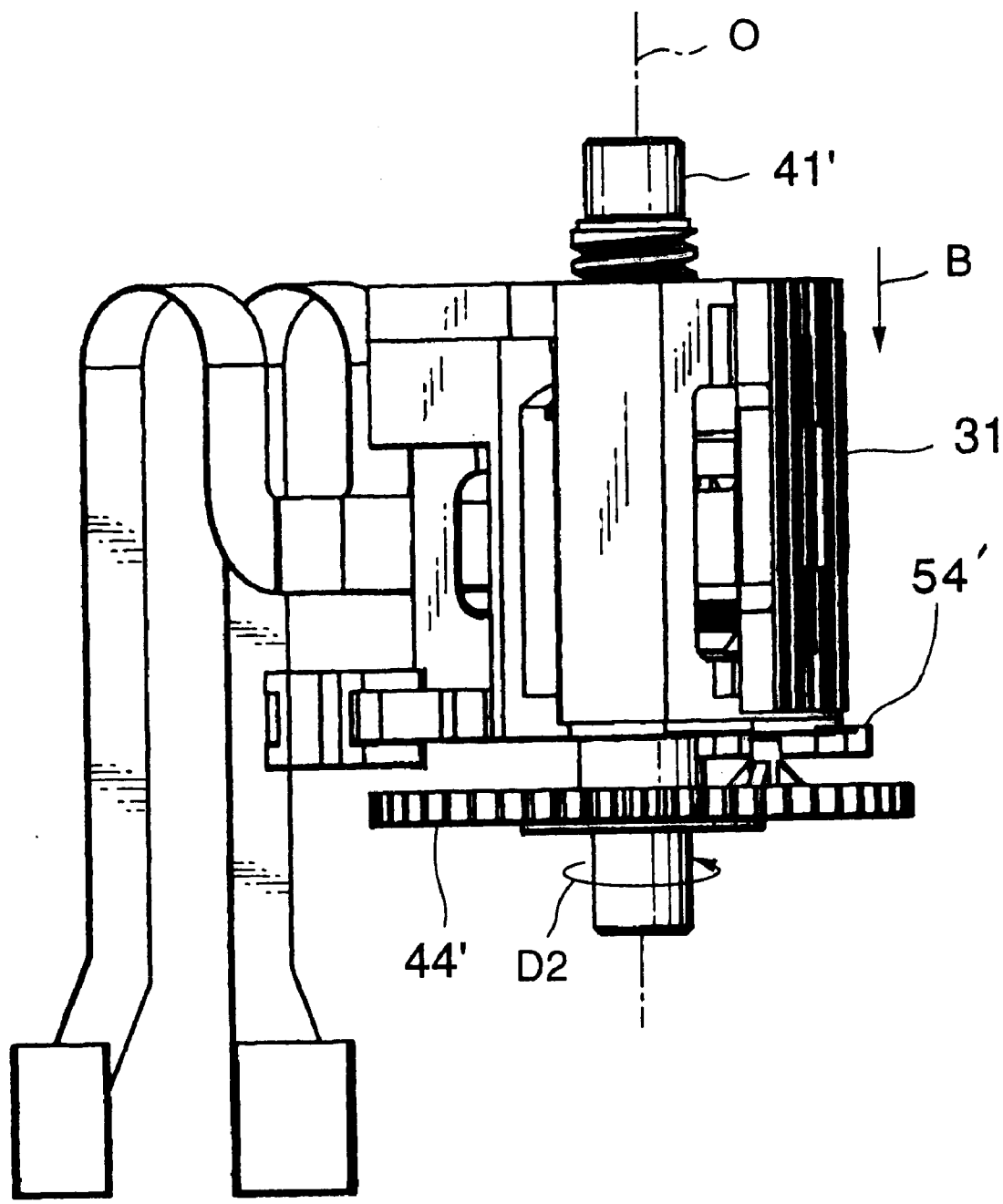
FIG. 6 is a side view of the conventional actuator assembly showing a position relationship between the cam bar of the conventional head protection mechanism and the lead screw gear when the conventional tape drive is not put into the recording/reproducing mode.
Figure 7:
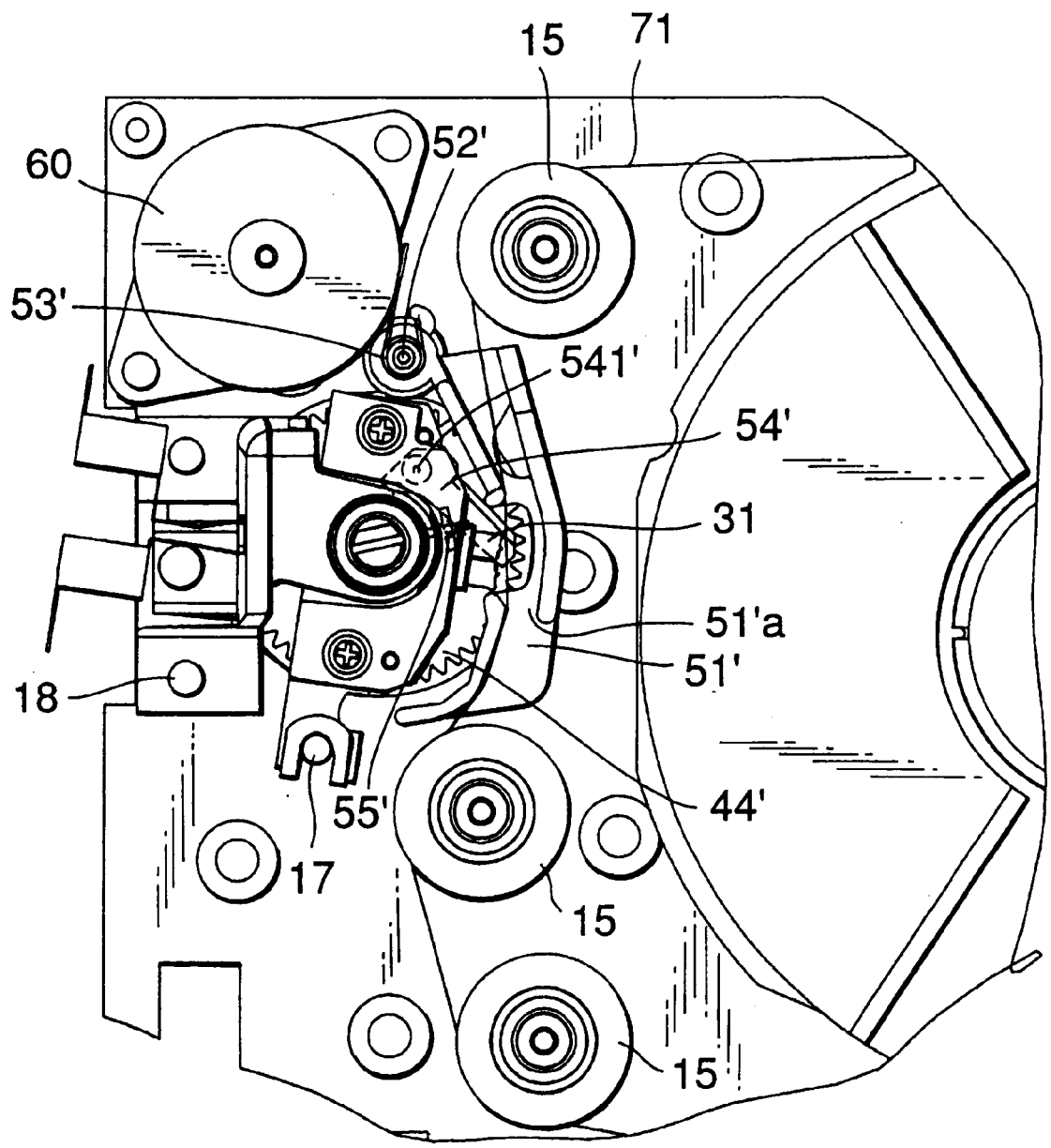
FIG. 7 is an enlarged plan view showing a position relationship of the protection arm in the conventional head protection mechanism when the conventional tape drive is not put into the recording/reproducing mode.

Referring now to FIGS. 4 through 7, description will be made as regards operation of the conventional head protection mechanism 50'. FIG. 4 is a side view of the actuator assembly 20' showing a position relationship between the cam bar 54' and the lead screw gear 44' when the tape drive 10' is put into a recording/reproducing mode. FIG. 5 is an enlarged plan view showing a position relationship of the protection arm 51' when the tape drive 10' is put into the recording/reproducing mode. In addition, FIG. 6 is a side view of the actuator assembly 20' showing a position relationship between the cam bar 54' and the lead screw gear 44' when the tape drive 10' is not put into the recording/reproducing mode. FIG. 7 is an enlarged plan view showing a position relationship of the protection arm 51' when the tape drive 10' is not put into the recording/reproducing mode.

Referring first to FIGS. 4 and 5, the description will be made as regards operation of the conventional head protection mechanism 50' in a case where the tape drive 10' is put into the recording/reproducing mode.

On the recording/reproducing mode, the magnetic head 31 is always used at any position moved from a position illustrated in FIG. 4 upwards, as shown in an arrow A. In other words, FIG. 4 shows a state where the magnetic head 31 is put into the lowest position in a range of normal recording/reproducing positions. In addition, when the magnetic head 31 is moved upwards, the lead screw 41' is rotated in a clockwise direction, as shown in an arrow D1 of FIG. 4.

In this state, as is apparent from FIG. 4, the projection 55' mounted on the lead screw gear 44' is not engaged with the cam bar 54' at all. Accordingly, a tip of the cam bar 54' is urged nearer to the lead screw 41' (or in a clockwise direction of its rotatable shaft 541') by the urging arrangement, as shown in FIG. 5. Thus, the cam bar 54' is not engaged with one of the inner protection plate portion 512' of the protection arm 51'. Accordingly, without driving of the head protection mechanism 50', the protection arm 51' is rotated around the rotatable shaft 52' in the clockwise direction due to an urging force of the spring 53' and the tape drive 10' is put into a state where one of the inner protection plate portion 512' is in contact with the head mounting portion 321 of the head assembly, as shown in FIG. 5. As a result, the tape drive 10' is put into a state where the magnetic head 31 is projected into the tape passing groove 51'a of the protection arm 51' between the pair of the inner protection plate portion 512'. Accordingly, pulled out of the supply reel of the tape cartridge, the magnetic tape depicted at 70 is in contact with the magnetic head 31 of the head assembly when the magnetic tape 70 passes through the tape passing groove 51'a of the protection arm 51 and information exchange between the magnetic tape 70 and the magnetic head 31 is carried out.

Referring first to FIGS. 6 and 7, the description will be made as regards operation of the conventional head protection mechanism 50' in a case where the tape drive 10' is not put into the recording/reproducing mode.

When the tape drive 10' is not put into the recording/reproducing mode, that is, either on tape loading or on tape unloading, the protection arm 51' of the head protection mechanism 50' is driven so that the above-mentioned coupled portion of the leader tape depicted at 71 is not in contact with the magnetic head 31.

More specifically, in this event, the magnetic head 31 is moved from the lowest position illustrated in FIG. 4 downwards as shown in an arrow B of FIG. 6. For this purpose, the lead screw gear 44' is rotated in a counterclockwise direction by the stepping motor 60 as shown in an arrow D2 of FIG. 6.

As a result, as shown in FIG. 6, the projection 55' of the lead screw gear 44' is engaged with the cam bar 54'.

Accordingly, the tip of the cam bar 54' is moved away from the lead screw 41' (or in the counterclockwise direction of the rotatable shaft 541') as shown in FIG. 7. Thus, the cam bar 54' is engaged with one of the inner protection plate portion 512' of the protection arm 51' as shown in FIG. 7. In the manner which is described above, the protection arm 51' of the head protection mechanism 50' is driven to rotate the protection arm 51' around the rotatable shaft 52' in the counterclockwise direction in opposition to the urging force of the spring 53'. As a result, one of the inner protection plate portion 512' is separated from the head mounting portion 321 of the head assembly and the magnetic head 31, which had been projected in the tape passing groove 51'a of the protection arm 51' between the pair of the inner protection plate portion 512', is put into a state where the magnetic head 31 is drawn back from the tape passing groove 51'a. Accordingly, the leader tape 71 pulled from the supply reel of the tape cartridge or the leader tape 71 of the take-up reel 11 is prevented from being contact with the magnetic head 31 of the head assembly when the leader tape 71 passes through the tape passing groove 51'a of the protection arm 51'. It is therefore possible to prevent the above-mentioned coupled portion of the leader tape 71 from being in contact with the magnetic head 31.

As described above, in order to avoid that the coupled portion of the leader tape 71 comes into contact with the magnetic head 31, on driving the protection arm 51', the conventional head protection mechanism 50' adopts a method of driving the protection arm 51' comprising the steps of lowering the magnetic head 31 from a normal used recording/reproducing position and of rotating the cam bar 55' by engaging the projection 55' of the lead screw gear 44' with the cam bar 55' formed on the head lifter 42'.

In the manner which is described above, inasmuch as it is necessary for the conventional head protection mechanism 50' to lower the magnetic head 31 from the normal used recording/reproducing position, an excessive space is required below the magnetic head 31. This prevents the tape drive 10' from thinning, as mentioned in the preamble of the instant specification.

In addition, inasmuch as the driving force (the driving source) for the head protection mechanism 50' is obtained by the stepping motor 60, the head protection mechanism 50' cannot have a sufficient axle ratio and is disadvantageous in that it is difficult to withstand a heavy lead, as also mentioned in the preamble of the instant specification.

Figure 8:
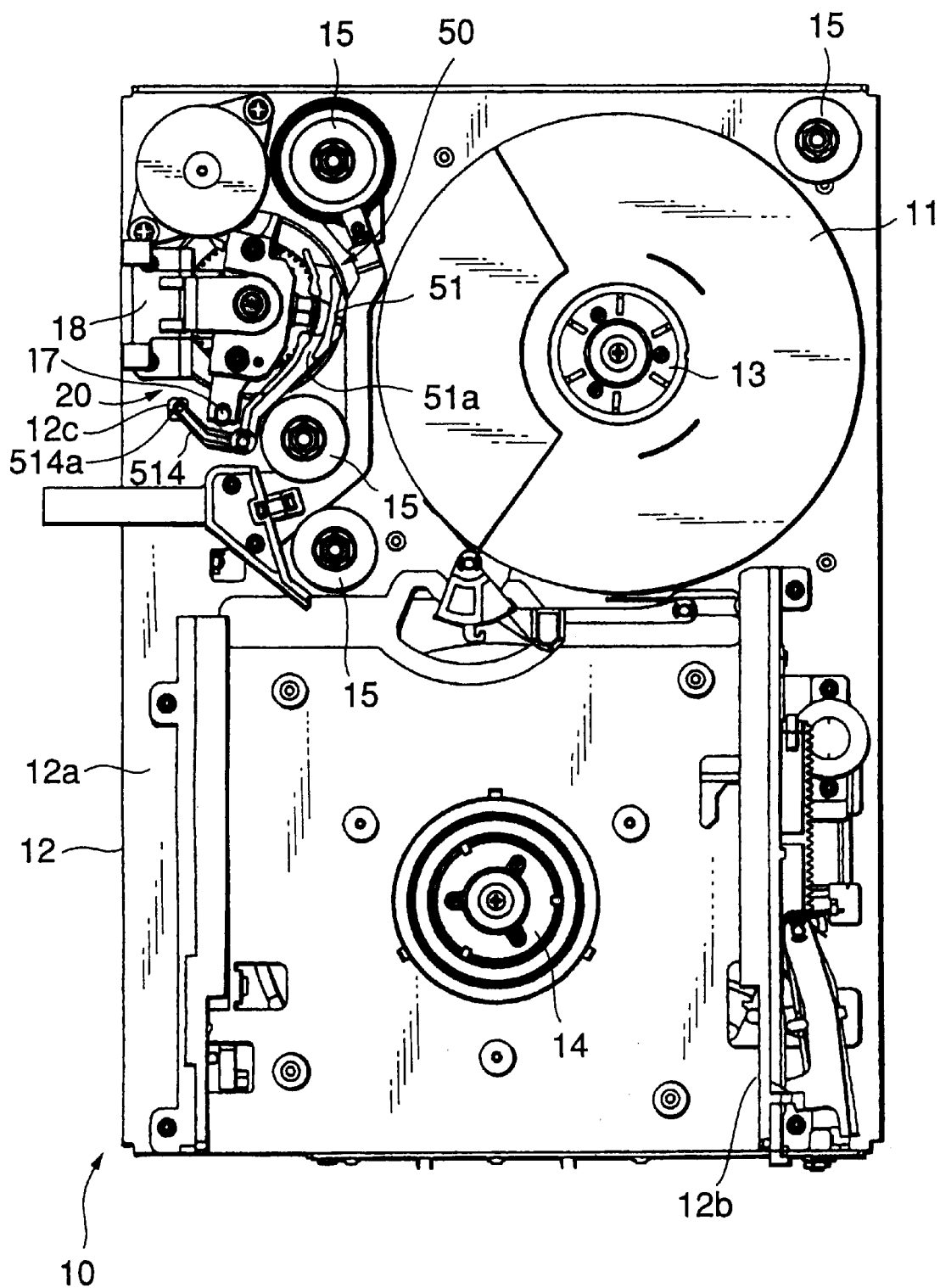
FIG. 8 is a plan view showing a tape drive including a head protection mechanism according to an embodiment of this invention with an upper cover removed therefrom.

Referring now to FIG. 8, the description will proceed to a tape drive including a head protection mechanism according to this invention. FIG. 8 is a plan view showing the tape drive with an upper cover removed therefrom.

The tape drive depicted at 10 is for receiving a tape cartridge (not shown) and contains a take-up reel 11 inside thereof. The take-up reel 11 is also called a spool. The tape drive 10 is generally comprised of a rectangular housing (chassis) 12 that has a common base 12a. The base 12a has first and second spindle motors (reel motors) 13 and 14. The first spindle motor 13 has the spool (or the take-up reel) 11 permanently mounted on the base 12a and the spool 11 is dimensioned to accept a relatively high speed streaming magnetic tape (not shown). The second spindle motor (reel motor) 14 is adapted to accept the removable tape cartridge. The removable tape cartridge is manually or automatically inserted into the tape drive 10 via a slot 12b formed on the housing 12 of the tape drive 10 along an insertion direction depicted at an arrow A. The first spindle motor 13 is called a take-up reel motor while the second spindle motor 14 is called a supply reel motor.

Upon insertion of the tape cartridge into the slot 12b, the tape cartridge engages the second spindle motor (the supply reel motor) 14 in a well-known manner in the art. Prior to rotation of the first and the second spindle motors (reel motors) 13 and 14, the tape cartridge is connected to the permanently mounted spool (the take-up reel) 11 by means of a mechanical buckling mechanism (not shown). A number of rollers (guide rollers) 15 positioned intermediate the tape cartridge and the permanent spool 11 guide the magnetic tape as it traverses at relatively high speeds back and forth between the tape cartridge and the permanently mounted spool 11. In addition, the housing 12 comprises a plate made of an irony magnetic material which press working is performed.

The tape drive 10 further comprises a magnetic tape head actuator assembly (which will later be merely called a "actuator assembly") 20. The actuator assembly 20 is located between the take-up spool 11 and the tape cartridge on a tape path (not shown) defined by the above-mentioned plurality of rollers 15. During operation, a magnetic tape flows forward and backward between the take-up spool 11 and the tape cartridge and is closely adjacent to the actuator assembly 20 while the magnetic tape flows on the defined tape path. In addition, a head protection mechanism 50 according to this invention is disposed closely to the actuator assembly 20.

Figure 9:
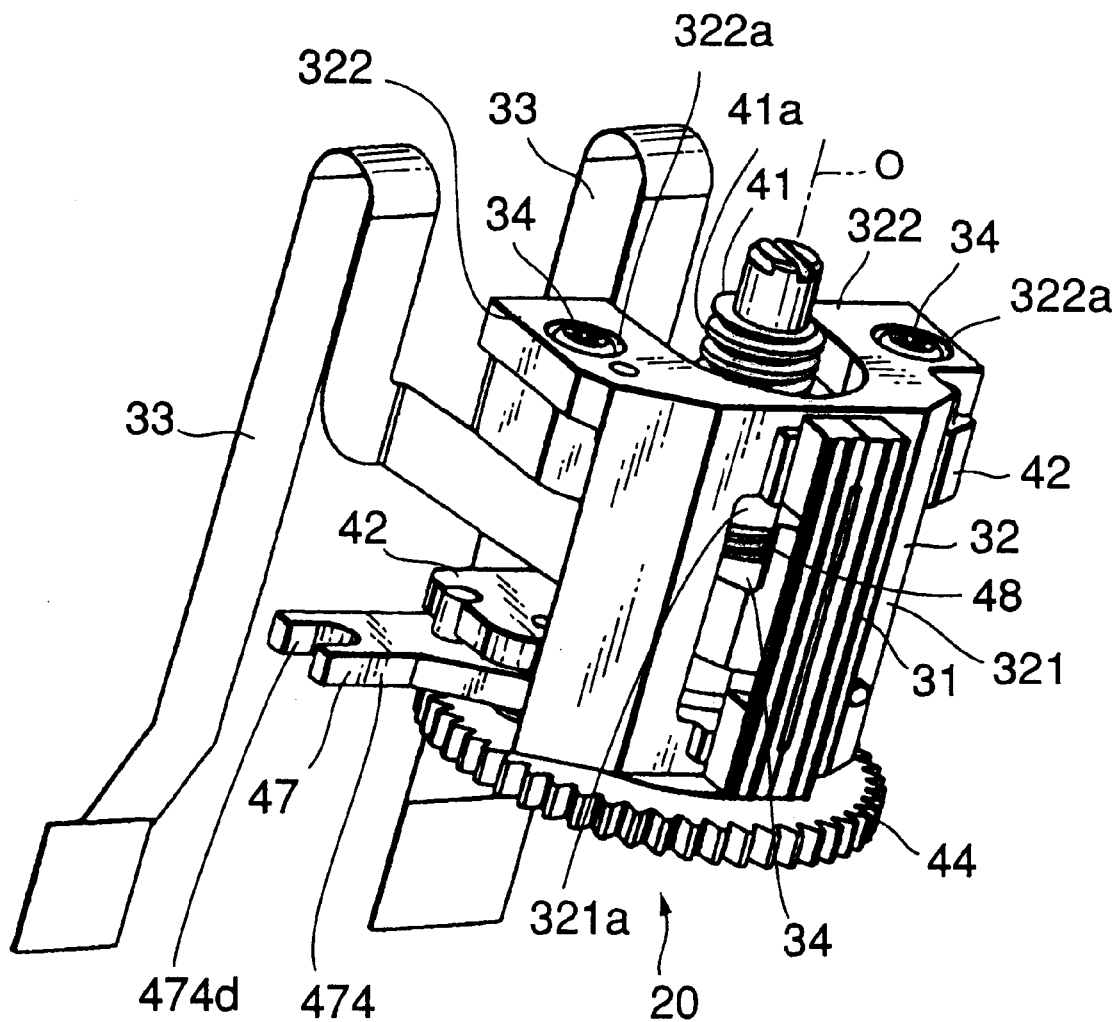
FIG. 9 is a perspective view showing an actuator assembly in the tape drive that is used together with the head protection mechanism according the embodiment of this invention.

Referring now to FIG. 9, the description will proceed to an actuator assembly 20. FIG. 9 is a perspective view showing the exterior of the actuator assembly 20.

The actuator assembly 20 mainly comprises a tape head assembly (which will later be merely called a "head assembly") and a head moving mechanism. The head assembly comprises a magnetic head (head) 31 extending up and down, a head holder 32 for holding the magnetic head 31, and a pair of flexible printed circuits (FPCs) 33 for electrically connecting between the magnetic head 31 and an external circuit (not shown).

The head holder 32 comprises a head mounting portion 321 for mounting the magnetic head 31 thereon, a pair of flanges 322 for extending from both sides of an upper end of the head mounting portion 321 in a direction perpendicular to the head mounting portion 321 opposite to each other. Each of the flanges 322 has a hole 322a for receiving a screw 34. By screwing the screws 34 through the holes 322a, the head assembly and the later-mentioned head moving mechanism are assembled to each other. In addition, the head mounting portion 321 has, at about a center thereof, an opening 321a through which ends of the pair of the flexible printed circuits (FPCs) 33 and the magnetic head 31 are electrically connected to each other.

On the other hands, the head moving mechanism comprises a lead screw (a threaded shaft) 41 with a screw thread 41a having a rotation center axis O, a head lifter 42 having a substantially hollow I-shape with a semi-cylindrical opening (which will later be called a "hollow opening) (not shown) at a center thereof, a preload bushing 43, a lead screw gear 44, and a head guide 47. The head lifter 42 is for moving the head assembly up and down with the above-mentioned head assembly held. The preload bushing 43 is disposed in the hollow opening of the head lifter 42 and has a thread groove (not shown) engaged with the screw thread 41a of the lead screw 41. The lead screw gear 44 is mounted on the lead screw 41 at a lower end thereof. The lead screw gear 44 is driven by another driving arrangement to rotate the lead screw 41 around the rotation center axis O. The head guide 47 is assembled with the head lifter 42 in the manner which will later be described. The head guide 47 has a thread groove (not shown) engaged with the screw thread 41a of the lead screw 41. Responsive to rotation of the lead screw 41 around the rotation center axis O, the head guide 47 moves, in cooperation with the preload bushing 43, the head lifter 42 in a direction extending the rotation center axis O (up and down).

The head guide 47 has one arm 474 in which a substantially U-shaped guide portion 474d is formed at a tip thereof. The guide portion 474d is slidably mounted on a guide bar 17 (FIG. 8) up and down. The guide bar 17 is mounted on the base 12a of the chassis 12 upwards. The guide portion 474d is for preventing the head lifter 42 from rotating.

The preload bushing 43 has a semi-ring-shaped groove (now shown) in which a preload spring 48 is inserted. The preload spring 48 is put between the preload bushing 43 and a lower surface in an upper portion of the head lifter 42 with the preload spring compressed. The preload spring 43 comprises a compressive coil spring. That is, by the preload spring 48, lower pushing pressure always acts the preload bushing 43 along the rotation center axis O of the lead screw 41 while upper pushing pressure always acts the head lifter 42 along the rotation center axis O of the lead screw 41. Inasmuch as the head guide 47 is mounted on the head lifter 42, upper pushing pressure always acts also the head guide 47 along the rotation center axis O of the lead screw 41.

A combination of the preload bushing 43 and the preload spring 48 serves as a backlash preventing mechanism for preventing backlash of the actuator assembly 20.

In addition, the actuator assembly 20 (the head moving mechanism) is rotatably supported on the base 12a of the chassis 12 by a bearing holder 18 (FIG. 8) mounted on the base 12a.

Figure 10:
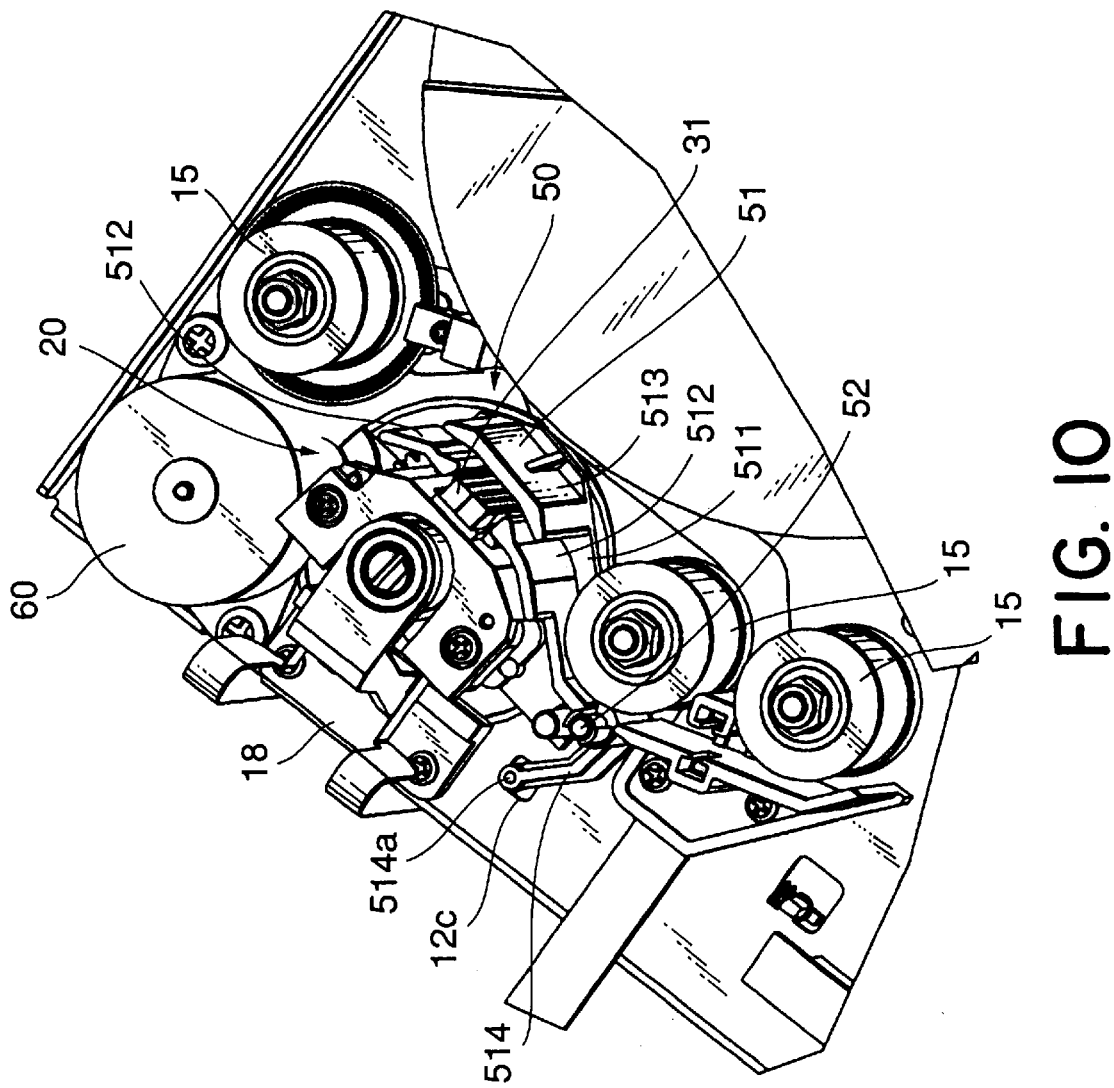
FIG. 10 is an enlarged perspective view showing a part of the head protection mechanism according to the embodiment of this invention.
Figure 11:
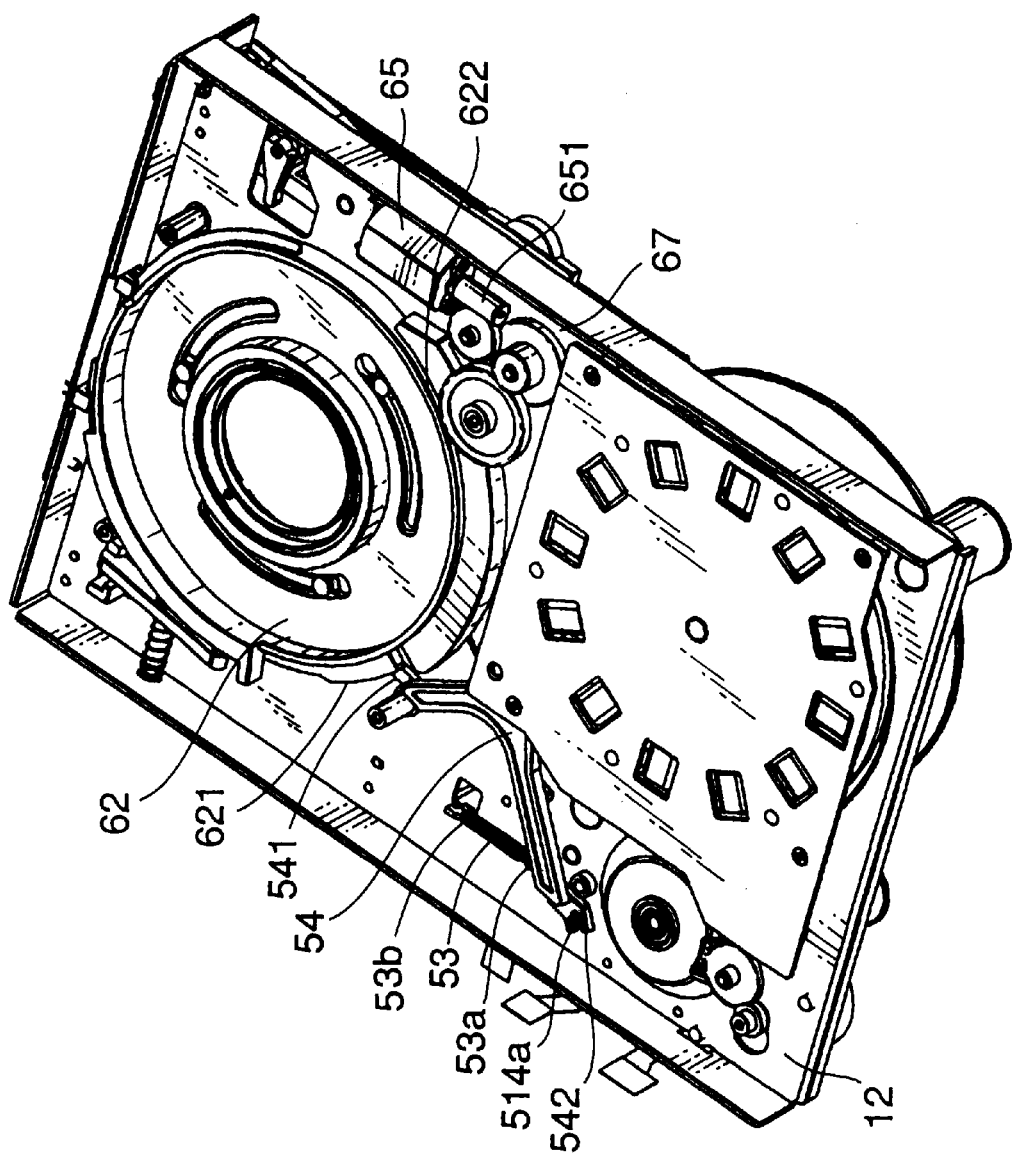
FIG. 11 is a perspective view showing a remaining part of the head protection mechanism illustrated in FIG. 10.

Referring to FIGS. 10 and 11, the description will proceed to the head protection mechanism depicted at 50.

As shown in FIG. 10, the head protection mechanism 50 comprises a protection arm 51 disposed closely to a front of the head assembly of the actuator assembly 20 so as to cover the magnetic head 31 of the head assembly. The protection arm 51 has a cross section of a substantially U-shaped and is rotatably disposed around the rotatable shaft 52.

More specifically, the protection arm 51 comprises a base plate portion 511, a pair of inner protection plate portions 512, and an outer protection plate portion 513. The pair of the inner protection plate portions 512 extends from an end of the base plate portion 511 at a side of the head assembly upwards perpendicular to the base plate portion 511 with the magnetic head 31 lain therebetween. The outer protection plate portion 513 extends from another end for the base plate portion 511 upwards perpendicular to the base plate portion 511 with apart from the pair of the inner protection plate portion 512 and the magnetic head 31 and with opposite to the magnetic head 31. That is, the protection arm 51 has a tape passing groove 51a, which is formed between the pair of the inner protection plate portion 512 and the outer protection plate portion 513, for passing the magnetic tape or the above-mentioned leader tapes.

In addition, as shown in FIG. 11, a driving portion of the head protection mechanism 50 (the protection arm 51) comprises a substantially L-shaped protection lever 54 having one end (an engaging end) 541 engaged with a cam face 621 of a ring cam 62 in a loading mechanism which is known in the art. In addition, the "loading mechanism" is a mechanism for engaging a supply reel contained in the tape cartridge with the supply reel motor. The ring cam 62 is coaxial with the rotation axis of the supply reel motor 14 (FIG. 8) and is rotatably disposed between a back surface of the chassis 12 and the supply reel motor 14.

The protection lever 54 is disposed a side of the back surface of the chassis 12 and is rotatably mounted on the chassis 12 around a fulcrum (a rotatable shaft) which will later be described. The protection lever 54 has another end 542 which extends toward the protection arm 51. The other end 542 of the protection lever 54 is coupled, via a hole 12c bored in the chassis 12, to a tip 514a of an arm portion 514 which extends from the rotatable shaft 52 of the protection arm 51. In addition, the protection lever 54 is urged around the fulcrum in a clockwise direction by a spring 53 which has an end 53a connected to the protection lever 54 and another end 53b connected to the chassis 12. In addition, as described above, inasmuch as the other end 542 of the protection lever 54 and the tip 514a of the arm portion 514 in the protection arm 51 are coupled to each other via the hole 12c, a rotatable range in the protection lever 54 and the protection arm 51 is restricted to a size of the hole 12c.

In the manner which is described above, the head protection mechanism 50 uses, as the driving source (the driving force) for the driving portion of the head protection mechanism 50 (the protection arm 51), a loading motor 65 for rotatably driving the ring cam 62. That is, the loading motor 65 has a rotational shaft 651 which is engaged with a gear portion 622 of the ring cam 62 through a row of gears 67.

Figure 12:
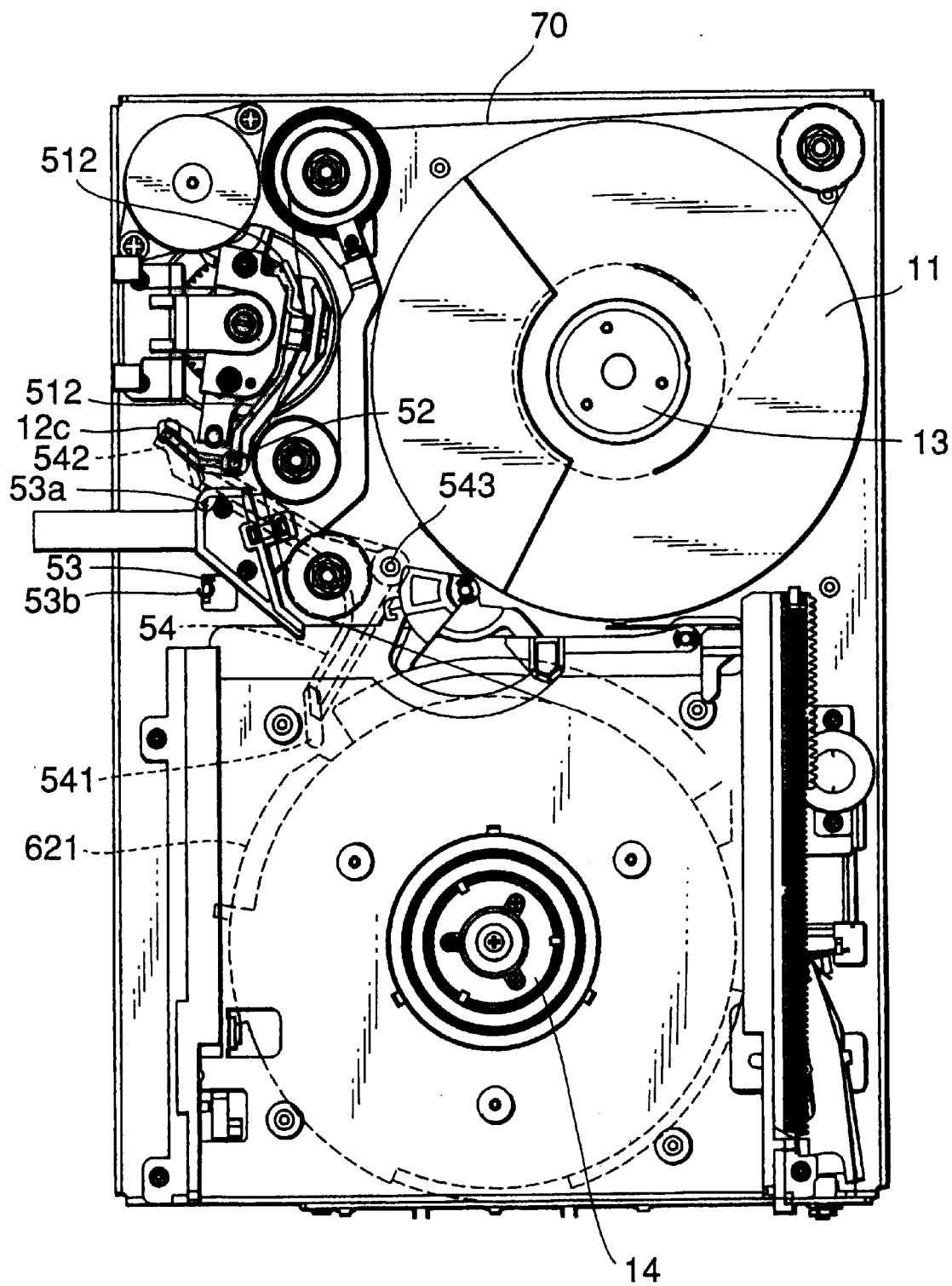
FIG. 12 is a plan view showing a position relationship between a protection arm in the head protection mechanism and a protection lever when the tape drive is put into a recording/reproducing mode.
Figure 13:
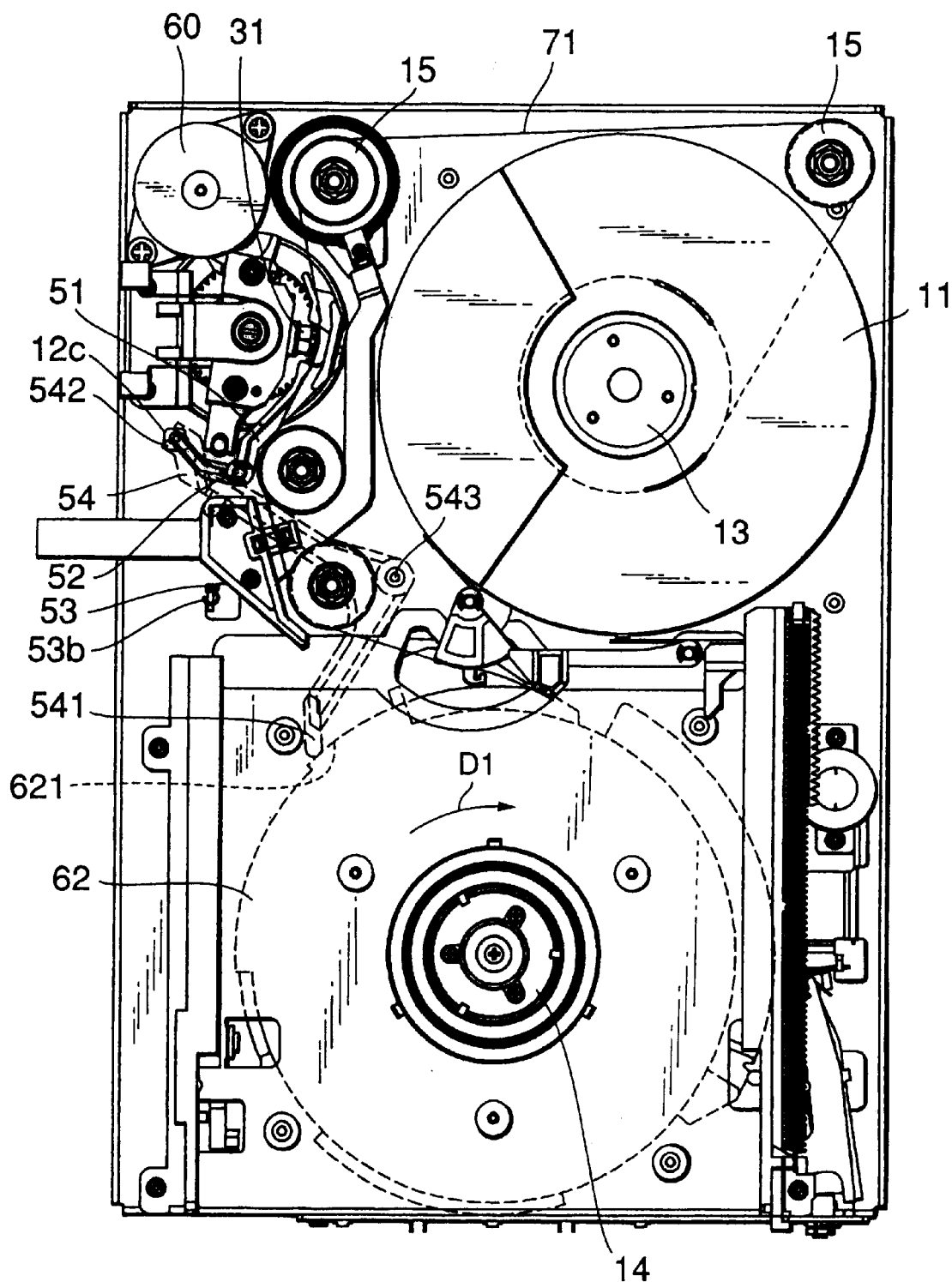
FIG. 13 is a plan view showing a position relationship between the protection arm in the head protection mechanism and the protection lever when the tape drive is not put into the recording/reproducing mode.

Referring now to FIGS. 12 and 13, description will be made as regards operation of the head protection mechanism 50. FIG. 12 is a plan view showing a position relationship of the protection arm 51 and the protection lever 54 when the tape drive 10 is put into a recording/reproducing mode. FIG. 13 is a plan view showing a position relationship of the protection arm 51 and the protection lever 54 when the tape drive 10 is not put into the recording/reproducing mode.

Referring first to FIG. 12, the description will be made as regards operation of the head protection mechanism 50 in a case where the tape drive 10 is put into the recording/reproducing mode.

On the recording/reproducing mode, as is apparent from FIG. 12, the ring cam 62 is positioned so that the cam face 621 of the ring cam 62 is not engaged with the one end 541 of the protection lever 54. Accordingly, the protection lever 54 is urged around the rotatable shaft (the fulcrum) 543 in a counterclockwise direction by the spring 53 having the end 53a connected to the other end 542 thereof. As a result, the other end 542 of the protection lever 54 is positioned to an edge of the hole 12c (a lower edge in FIG. 12). Accordingly, without driving of the head protection mechanism 50, the protection arm 51 is rotated around the rotatable shaft 52 in the counterclockwise direction due to an urging force of the above-mentioned spring 53 and the tape drive 10 is put into a state where the pair of the inner protection plate portion 512 is most close to the front of the head mounting portion 321 of the head assembly, as shown in FIG. 12. As a result, as shown in FIG. 12, the tape drive 10 is put into a state where the magnetic head 31 is projected into the tape passing groove 51a of the protection arm 51 between the pair of the inner protection plate portion 512. Accordingly, pulled out of the supply reel of the tape cartridge, the magnetic tape 70 is in contact with the magnetic head 31 of the head assembly when the magnetic tape 70 passes through the tape passing groove 51a of the protection arm 51 and information exchange between the magnetic tape 70 and the magnetic head 31 is carried out.

Referring first to FIG. 13, the description will be made as regards operation of the conventional head protection mechanism 50 in a case where the tape drive 10 is not put into the recording/reproducing mode.

When the tape drive 10 is not put into the recording/reproducing mode, that is, either on tape loading or on tape unloading, the protection arm 51 of the head protection mechanism 50 is driven so that the above-mentioned coupled portion of the leader tape 71 is not in contact with the magnetic head 31.

More specifically, the ring cam 62 is rotated in a clockwise direction by the loading motor 65 (FIG. 11), as shown in an arrow D1 of FIG. 13.

As a result, as shown in FIG. 13, the cam face 621 of the ring cam 62 is engaged with the one end 541 of the protection lever 54. Accordingly, the protection lever 54 is rotated around the rotatably shaft 543 in the clockwise direction, as shown in FIG. 13, in opposition to the urging force of the spring 53 having the end 53a connected to the other end 542 thereof. Thus, the protection arm 51 of the head protection mechanism 50 also is rotatably driven around the rotatable shaft 52 in the clockwise direction in opposition to the urging force of the spring 53. As a result, the pair of the inner protection plate portion 512 is rotated away from the head mounting portion 321 of the head assembly and the magnetic head 31, which had been projected in the tape passing groove 51a of the protection arm 51 between the pair of the inner protection plate portion 512 until now, is put into a state where the magnetic head 31 is drawn back from the tape passing groove 51a. Accordingly, the leader tape 71 pulled from the supply reel of the tape cartridge or the leader tape 71 of the take-up reel 11 is prevented from being contact with the magnetic head 31 of the head assembly when the leader tape 71 passes through the tape passing groove 51a of the protection arm 51. It is therefore possible to prevent the above-mentioned coupled portion of the leader tape 71 from being in contact with the magnetic head 31.

Inasmuch as the head protection mechanism 50 according to this embodiment obtains the driving force of the protection arm 51 by the ring cam which uses the loading motor 65 as the driving source, it is unnecessary to lower the magnetic head 31 from the normal used recording/reproducing position on the tape loading or on tape unloading in the manner as the conventional actuator assembly 20'. As a result, it is possible to thin the tape drive 10. In addition, inasmuch as the loading motor 65 is used as the driving source of the head protection mechanism 50 (the protection arm 51), it is possible to have a sufficient axle ratio and to withstand a heavy lead.

While this invention has thus far been described in conjunction with a preferred embodiment thereof, it is to be understood that modifications will be apparent to those skilled in the art without departing from the spirit of the invention. For example, although the above-mentioned embodiment uses, as the driving portion for driving the protection arm 51, a rotation type such as the ring cam 62 and the protection lever 54, this invention is not restricted to this type and may use, as the driving portion for driving the protection arm 51, a slide type.

What is claimed is:

1. A head protection mechanism for use in a tape drive, said tape drive comprising a chassis, a take-up reel rotatably mounted on a main surface of said chassis, a take-up reel motor mounted on a back surface of said chassis for rotatably driving said take-up reel, a slot disposed on the main surface of said chassis for inserting a tape cartridge containing a supply reel, a supply reel motor mounted on the back surface of said chassis at a position opposed to said slot for rotatably driving said supply reel in said tape cartridge, and a loading mechanism for engaging said supply reel with said supply reel motor after said tape cartridge is inserted in said slot, said loading mechanism including a loading motor disposed on the back surface of said chassis and a ring cam operatively driven by said loading motor, said ring cam having a cam face, said ring cam being coaxial to a rotation axis of said supply reel motor, said ring cam being disposed between the back surface of said chassis and said supply reel motor, said tape drive further comprising an actuator assembly liftably mounted on the main surface of said chassis, said actuator assembly including a magnetic head for carrying out information exchange between said magnetic head and a magnetic tape pulled from said supply reel to said take-up reel, said head protection mechanism being for protecting said magnetic head so that a coupled portion between a first reader tape of said take-up reel and a second reader tape of said supply reel is not in contact with said magnetic head on tape loading and on tape unloading, said head protection mechanism comprising:

a protection arm rotatably mounted on the main surface of said chassis close to said actuator assembly so as to cover said magnetic head, said protection arm having a tape passing groove through which said magnetic tape, said first and said second reader tapes pass, said protection arm including an arm portion;

a protection lever rotatably mounted on said back surface of said chassis, said protection lever having one end which is close to said ring cam and which is engageably disposed to said cam face, said protection lever having another end coupled to a tip of said arm portion in said protection arm via a hole bored in said chassis; and urging means always urging said protection arm nearer to said actuator assembly, when said tape drive is put into a recording/reproducing mode, said head protection mechanism acting to project said magnetic head into said tape passing groove so as to be in contact with said magnetic tape by positioning said one end of said protection lever at a position where said one end of said protection lever is not engaged with said cam face of said ring cam and by putting said protection arm close to said actuator assembly due to an urging force of said urging means, when said tape drive is not put into the recording/reproducing mode, said head protection mechanism acting to put back said magnetic head from said tape passing groove by engaging said one end of said protection lever with said cam face of said ring cam caused by rotatably driving of said ring cam using said loading motor and by separating said protection arm from said actuator assembly caused by rotatably moving of said protection lever in opposition to the urging force of said urging means.

2. A head protection mechanism as claimed in claim 1, wherein said urging means comprises a spring having an end connected to said protection lever and another end connected to said chassis.

3. A tape drive comprising:

a chassis;

a take-up reel rotatably mounted on a main surface of said chassis;

a take-up reel motor, mounted on a back surface of said chassis, for rotatably driving said take-up reel;

a slot, disposed on the main surface of said chassis, for inserting a tape cartridge containing a supply reel;

a supply reel motor, mounted on the back surface of said chassis at a position opposed to said slot, for rotatably driving said supply reel in said tape cartridge;

a loading mechanism for engaging said supply reel with said supply reel motor after said tape cartridge is inserted in said slot, said loading mechanism including a loading motor disposed on the back surface of said chassis and a ring cam operatively driven by said loading motor, said ring cam having a cam face, said ring cam being coaxial to a rotation axis of said supply reel motor, said ring cam being disposed between the back surface of said chassis and said supply reel motor;

an actuator assembly liftably mounted on the main surface of said chassis, said actuator assembly including a magnetic head for carrying out information exchange between said magnetic head and a magnetic tape pulled from said supply reel to said take-up reel; and a head protection mechanism for protecting said magnetic head so that a coupled portion between a first reader tape of said take-up reel and a second reader tape of said supply reel is not in contact with said magnetic head on tape loading and on tape unloading, said head protection mechanism comprising:

a protection arm rotatably mounted on the main surface of said chassis close to said actuator assembly so as to cover said magnetic head, said protection arm having a tape passing groove through which said magnetic tape, said first and said second reader tapes pass, said protection arm including an arm portion;

a protection lever rotatably mounted on said back surface of said chassis, said protection lever having one end which is close to said ring cam and which is engageably disposed to said cam face, said protection lever having another end coupled to a tip of said arm portion of said protection arm via a hole bored in said chassis; and urging means always urging said protection arm nearer to said actuator assembly, when said tape drive is put into a recording/reproducing mode, said head protection mechanism acting to project said magnetic head into said tape passing groove so as to be in contact with said magnetic tape by positioning said one end of said protection lever at a position where said one end of said protection lever is not engaged with said cam face of said ring cam and by putting said protection arm close to said actuator assembly due to an urging force of said urging means, when said tape drive is not put into the recording/reproducing mode, said head protection mechanism acting to put back said magnetic head from said tape passing groove by engaging said one end of said protection lever with said cam face of said ring cam caused by rotatably driving of said ring cam using said loading motor and by separating said protection arm from said actuator assembly caused by rotatably moving of said protection lever in opposition to the urging force of said urging means.

4. A tape drive as claimed in claim 3, wherein said urging means comprises a spring having an end connected to said protection lever and another end connected to said chassis.

* * * * *